United States Patent

Hallman et al.

[15] 3,637,377

[45] Jan. 25, 1972

[54] METHOD FOR MAKING A PATTERN ON A SUPPORT MEMBER BY MEANS OF ACTINIC RADIATION SENSITIVE ELEMENT

[72] Inventors: Robert W. Hallman, Utica; Gary W. Kurtz, Southfield, both of Mich.

[73] Assignee: Teeg Research, Inc., Detroit, Mich.

[22] Filed: July 15, 1969

[21] Appl. No.: 841,718

Related U.S. Application Data

[63] Continuation-in-part of Ser. No. 627,813, Apr. 3, 1967, and a continuation-in-part of 662,214, Aug. 21, 1967.

[52] U.S. Cl. ....................................96/35, 96/27 R, 96/36, 96/36.2, 117/8, 156/3, 156/4, 156/17, 156/18, 250/65 R, 250/65.1

[51] Int. Cl. ....................................G03c 5/00, G03c 5/04

[58] Field of Search................96/1.5, 27, 35, 36, 36.2, 36.3, 96/86, 88; 252/501; 117/93.3, 217; 29/195; 156/3, 4, 17, 18; 209/157.1; 250/65, 65.1

[56] References Cited

UNITED STATES PATENTS

| | | | |
|---|---|---|---|
| 2,912,592 | 11/1959 | Mayer | 96/1.5 |
| 2,962,376 | 11/1960 | Schaffert | 96/1.5 |
| 3,122,463 | 2/1964 | Ligenza et al. | 156/4 |
| 3,271,180 | 9/1966 | White | 96/36 X |
| 3,317,409 | 5/1967 | Kaspaul et al. | 96/1.5 X |
| 3,346,384 | 10/1967 | Gaynor | 96/36 |
| 3,377,169 | 4/1968 | Blake | 96/88 |
| 3,386,823 | 6/1968 | Keller et al. | 96/27 |
| 3,440,046 | 4/1969 | Droebe et al. | 96/27 |

FOREIGN PATENTS OR APPLICATIONS

| | | |
|---|---|---|
| 344,354 | 3/1931 | Great Britain |
| 968,141 | 8/1964 | Great Britain |
| 1,151,310 | 9/1969 | Great Britain |

OTHER PUBLICATIONS

Kostyshin et al., " Photographic Sensitivity Effect in Thin Semiconducting Films on Metal Substrates," Soviet Physics–Solid State, Vol. 8, No. 2, Feb. 1966, pp. 451–452.

*Primary Examiner*—George F. Lesmes
*Assistant Examiner*—R. E. Martin
*Attorney*—Hauke, Gifford and Patalidis

[57] ABSTRACT

A method for making a pattern on a support member by projecting an actinic image of the pattern to be reproduced on an electromagnetic-radiation-sensitive element consisting of a support member or substrate having an adhering metallic layer thereon, the metallic layer, as defined herein, being in turn coated with an adhering overlayer of an inorganic material capable of reacting, when exposed to electromagnetic actinic radiation, with the metallic layer. After exposure, the overlayer is peeled, thereby removing from the support member or substrate portions of the metallic layer corresponding to the nonradiated areas of the element, while the radiated areas of the element remain adhering to the support member or substrate. Alternately, after exposure of the element to a pattern forming image, the element is uniformly exposed to actinic radiation for a time sufficient to decrease the adhesion between the metallic layer and the overlayer, and the two layers are separated or peeled away from each other such that there is formed a pattern upon the support member or substrate.

16 Claims, 22 Drawing Figures

INVENTORS
ROBERT W. HALLMAN
GARY W. KURTZ

By Hauke, Gifford, & Patalidis
ATTORNEYS

INVENTORS
ROBERT W. HALLMAN
GARY W. KURTZ

By Hauke, Gifford, & Patalidis
ATTORNEYS

METHOD FOR MAKING A PATTERN ON A SUPPORT MEMBER BY MEANS OF ACTINIC RADIATION SENSITIVE ELEMENT

CROSS-REFERENCE TO RELATED APPLICATIONS

The present application is a continuation-in-part of applications Ser. No. 627,813, filed Apr. 3, 1967 and Ser. No. 662,214, filed Aug. 21, 1967, and is copending with applications Ser. No. 839,038, filed July 3,1969 and Ser. No. 841,416 filed July 14, 1969.

BACKGROUND OF THE INVENTION

In the copending parent applications, there are disclosed electromagnetic-radiation-sensitive elements which typically consist of a metallic layer as defined therein and herein deposited on a support member, or substrate, coated with an adhering stratum forming an overlayer of an inorganic material capable of interreacting with the metallic layer when exposed to incident actinic radiation, such as light radiation and the like. The radiation induced interreaction between the metallic layer and the overlayer extends in depth from the interface between the layer and the overlayer proportionally to the exposure to radiation of the radiation sensitive element. There is formed at the interface between the metallic layer and the overlayer, as a result of such actinic radiation induced interreaction, a product or products having a chemical composition and physical characteristics different from those of the constituents of both the metallic layer and the overlayer. For sufficient exposure, either in time, radiation intensity, or both, at the irradiated boundary or interface areas, the formation of such interreaction product or products is sufficient to consume in depth the totality of the metallic layer and/or the overlayer, such as to provide an etching of the metallic layer all the way to the support member.

It has been discovered that if the force of adhesion between the metallic layer and the support backing is less than the force of adhesion between the metallic layer and the overlayer of an electromagnetic radiation sensitive element according to the invention, a predetermined pattern of the material forming the metallic layer can be obtained on the support member by exposing the electromagnetic-radiation-sensitive element to a discrete and selective area irradiation which discretely and selectively causes a radiation provoked interreaction between the overlayer and the metallic layer at the interface therebetween sufficient only to break the otherwise strong bond therebetween, or at least sufficient to reduce the force of adhesion therebetween below the normal force of adhesion between the metallic layer and the support member.

The pattern on the support member is then obtained by simply peeling the overlayer such that, during removal of the overlayer, portions of the metallic layer remain adhering to the overlayer which correspond to the areas of the interface which have not been irradiated, while the areas of the interface which have been irradiated cause an easy separation between the overlayer and the metallic layer which thus remains, at such irradiated areas, adhering to the underlying support member.

Alternately, the present invention also contemplates forming a pattern by following the normal exposure of the radiation sensitive element to an electromagnetic actinic radiation image in a predetermined pattern that causes etching of the metallic layer according to such pattern, with a second uniform exposure to electromagnetic actinic radiation of intensity and duration sufficient only to cause a slight interreaction between the metallic layer and the overlayer at the boundary therebetween which results in a substantial reduction of the force of adhesion therebetween. The remaining of the overlayer is subsequently pulled apart or peeled from the metallic layer such that a pattern corresponding to the image projected on the electromagnetic radiation sensitive element is thus formed on the support member or substrate.

SUMMARY OF THE INVENTION

It is therefore a principal object of the invention to provide a method for making patterns on a support member or substrate by exposing an electromagnetic-radiation-sensitive element to an actinic image of the pattern to be obtained on the support member or substrate, the element consisting of a metallic layer as defined herein adhering to a support member or substrate, the metallic layer being in turn provided with an overlayer of an inorganic material capable of reacting with the metallic layer when exposed to actinic radiation, and by peeling the overlayer after exposure, such that a pattern is formed on the support or substrate. The pattern is a negative representation of the image and it is formed by the areas of the metallic layer remaining adhering to the support member or substrate as a result of the reduction in adhesion between the metallic layer and the overlayer caused by the reaction therebetween during exposure.

BRIEF DESCRIPTION OF THE DRAWINGS

Other objects and advantages of the present invention will become apparent when the following description of a few examples of the best modes contemplated for practicing the invention is considered in conjunction with the accompanying drawings, wherein like reference numerals refer to like or equivalent parts, and in which.

DESCRIPTION OF THE PREFERRED EMBODIMENTS

Figures 1, 2, 3, 4, 5, 6, 7, 8:
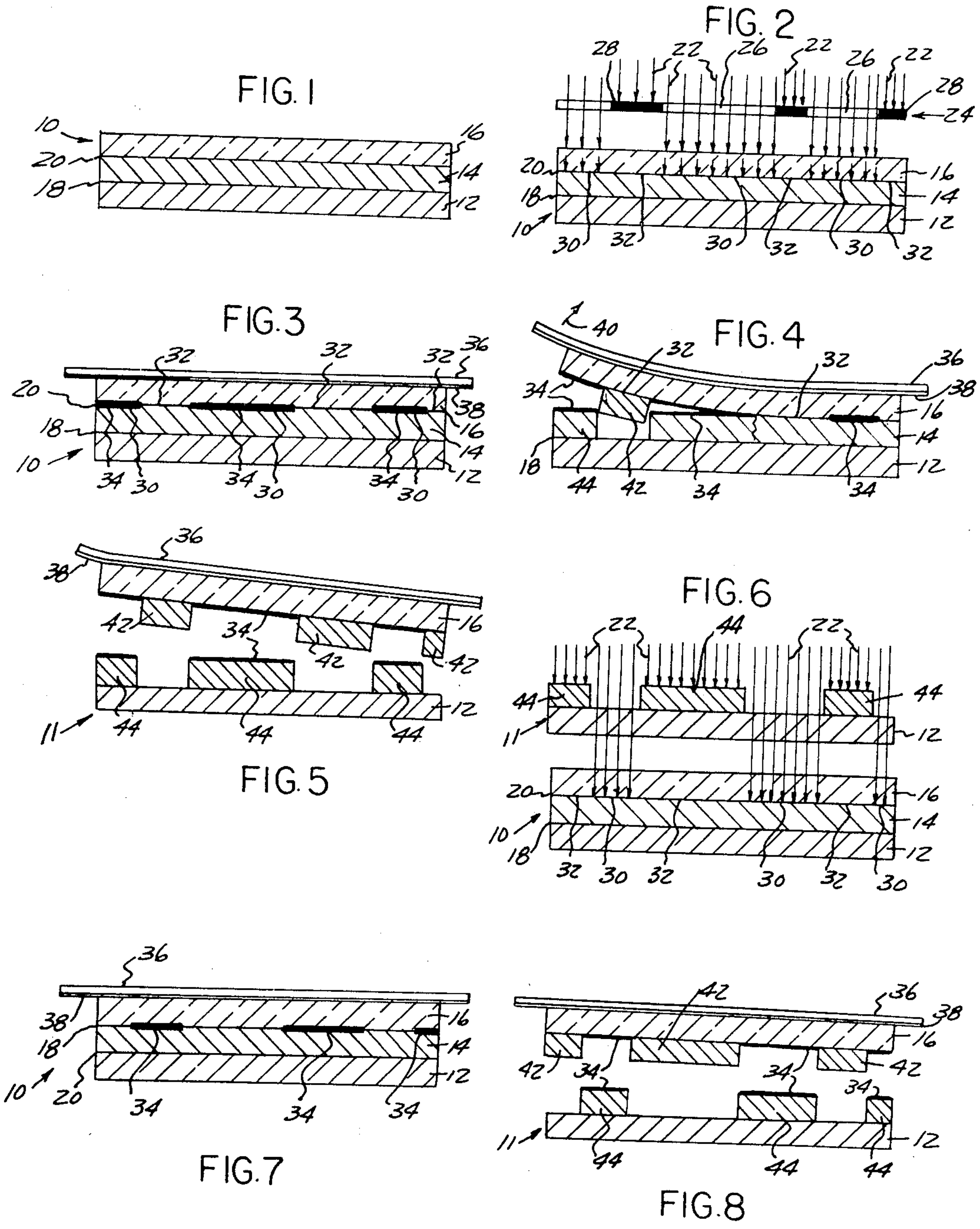
FIG. 1 is a schematic representation, in section, of an example of electromagnetic radiation sensitive element for use in practicing the method of the present invention.
FIGS. 2–5 are schematic representations of consecutive steps in a first aspect of a method according to the present invention.
FIGS. 6–8 are schematic representations of subsequent alternate steps according to said first aspect of the method of the present invention.

In order to practice the method of the present invention, an electromagnetic-radiation-sensitive element, schematically shown in section at 10 in a grossly exaggerated manner in FIG. 1, is prepared by coating a substrate or support member 12 with a silicon or metalic layer 14 which is in turn coated with an overlayer 16 of inorganic material. The material of the substrate or support member 12 may be a metal or it may be nonmetallic as consisting of, for example, glass, plastic, cardboard, paper, or the like.

As mentioned in the copending application Ser. No. 839,038, a list of elements particularly suitable for the metallic layer 14 includes, among others, silver, copper, lead, cadmium, zinc, iron, tin, arsenic, bismuth, cobalt, germanium, indium, manganese, mercury, nickel, selenium, silicon, tellurium, thallium and vanadium, while metals such as gold, rhodium, palladium, platinum, aluminum, magnesium and the like have been found to be of little, if any, usefulness for the purpose of the invention. The metallic layer is in the form of a thin film or of a thin foil of a thickness that may vary, according to the purpose to be accomplished and according to the proposed use of the sensitive element, from a few atom layers to several thousand Angstroms.

By "metallic layer" is meant herein a layer containing any one of the common metals or silicon hereinbefore mentioned, either alone, or alloyed to another common metal, or in the form of a metallic mixture. Consequently, the term "metallic layer" as used herein means a material containing silicon or at least one metal in the form hereinbefore indicated.

The overlayer 16 is also substantially thin, of the order of a few atom layers to several microns, or even a few mils, and it may consist of any one of a variety of ternary and binary materials and compounds and any one of a few elements. As also mentioned in the hereinbefore referred to copending application, an example of ternary material, which has been found to be particularly suitable, is a glassy material consisting of arsenic, sulfur and iodine for example in the following proportions: arsenic—40 percent by weight, sulfur—50 percent by weight and iodine—10 percent by weight, although the proportion of iodine may be within the range of 1 to 30 percent by weight. Appropriate examples of such ternary materials are given in U.S. Pat. No. 3,034,119, issued Mar. 6, 1962. In such ternary materials, iodine, may be replaced by chlorine or bromine and sulfur may be replaced by selenium or tellurium.

A multitude of binary compounds and mixtures have been found to be useful for the inorganic material of the overlayer 16. Examples of such binary compounds or mixtures comprise halides of metals, such as copper, antimony, arsenic, sulfur, thallium, lead, cadmium and silver, sulfides, arsenides, selenides, and tellurides of such metals. The most suitable materials, presenting substantially sensitivity when deposited on a metallic layer of copper, silver, lead, zinc, etc., for example, are arsenic-sulfur mixtures and compounds, antimony-sulfur compounds and mixtures, silver-sulfur compounds and mixtures, bismuth-sulfur compounds and mixtures, chromium-sulfur compounds and mixtures, lead iodide, copper chloride, stannous chloride, mercury chloride, arsenic selenides, selenium-sulfur compounds and mixtures, chromium selenium, and indium-sulfur compounds and mixtures. It seems that the property of reacting with a silicon layer or a metallic layer under the influence of actinic electromagnetic radiation is shared by a variety of mixtures and compounds, having such property to varying but generally useful degrees. Such binary compounds and mixtures may be generally cataloged as consisting of a metal halide, or a mixture of a metal with a halogen, metal selenide, or a mixture of metal with selenium, metal sulfide, or a mixture of a metal with sulfur, and metal telluride, or a mixture of a metal with tellurium. Stoichiometric proportions are not critical, but it is preferable that the resulting material be substantially transparent to electromagnetic actinic radiations of an appropriate wavelength, specially when the overlayer is substantially thick. Glassy compounds and mixtures are generally preferred for that purpose when used in a substantial thickness.

Single elements, such as halogens, are also capable of reacting with a metallic layer when exposed to actinic electromagnetic radiation.

Consequently, a general grouping of inorganic materials suitable in the present invention as the material forming an actinically reactive overlayer when disposed on a metallic layer, as defined herein, consists of halogens, sulfur, selenium, M–X compounds and mixtures and M–X–Y compounds and mixtures, wherein X and Y are selected from the group consisting of a halogen, sulfur, selenium and tellurium, and M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver.

Although several examples of suitable inorganic materials are given in the aforesaid copending application, all of which are suitable for the present invention, a particularly suitable binary material presenting substantial sensitivity when deposited on an appropriate layer of silicon or a metallic layer, such as silver, copper, cadmium, lead, zinc or other metal, is an arsenic-sulfur compound or mixture, for example, an overlayer 16 of arsenic-sulfur may be deposited upon a metallic layer 14 of silver, by conventional vacuum deposition techniques and other methods. The proportions of arsenic and sulfur may be varied broadly, such proportions preferably ranging from about 20 percent arsenic–80 percent sulfur by weight to 80 percent arsenic–20 percent sulfur by weight.

A typical example of electromagnetic-radiation-sensitive element 10, (FIG. 1), is made, for example, according to the following steps. An adequate substrate 12, such as a plate of glass, although other substrate materials such as ceramic, plastic, cardboard, or a metal such as, for example, aluminum or magnesium may be used, is coated with a thin metallic layer 14 by being disposed in a bell jar evacuated at about 0.05 micron pressure. Silver metal is evaporated from tungsten electrical resistance heaters brought to about 1,100° C. by the passage of electrical current therethrough. By evaporating silver from the resistance heaters for about three seconds, a silver layer of about 4,000 A. is obtained on the substrate. Longer evaporation times provide proportionally thicker silver layers. For example, 15 to 20 seconds evaporation time provides silver layers on the substrate of approximately 1 micron. The thickness of the thin layer of silver deposited on the substrate is continuously monitored by a thin film thickness monitor.

The substrate with this silver coating thereon is then disposed in a bell jar evacuated to about 0.1 micron pressure. A mixture consisting of 60 percent arsenic and and 40 percent sulfur, by weight, is placed in a quartz crucible in an electric resistance heater in the bell jar, the substrate with the silver coating thereon being located about six inches from the crucible. The arsenic-sulfur mixture is heated to about 350° C. An evaporation time of about 28–30 seconds permits to obtain an overlayer 16 of arsenic-sulfur about 1 micron thick, with longer evaporation times providing proportionally thicker overlayers, and shorter evaporation times providing proportionally thinner overlayers.

Similar vacuum evaporation techniques may be used for depositing a metallic layer of silicon or a layer containing any appropriate metal, as hereinbefore indicated, on an appropriate substrate, and for depositing thereon an overlayer of an appropriate inorganic material, as also hereinbefore indicated.

A silver layer 14, deposited on a glass substrate 12, forms at the interface 18 between the silver layer and the glass substrate an adhesion bond having a predetermined force of adhesion. The overlayer 16 of arsenic-sulfur, when deposited under the conditions hereinbefore described, forms a bond at the interface 20 between the silver layer 14 and the arsenic-sulfur overlayer 16 presenting an adhesion greater than the adhesion of the bond at the interface 18 between the metallic layer 14 and the glass substrate 12. It is obvious that by proper selection of the material of the substrate, its surface condition, either perfectly polished or slightly roughened, the type of metal used for the metallic layer, and the type of inorganic material used for the overlayer, various degrees of mutual adhesion between the layers may thus be provided, as will be obvious to those skilled in the art. Strength of adhesion may be measured in arbitrary units such as pounds per square inch required to separate juxtaposed layers. The absolute strengths of adhesion between the metallic layer and the substrate and between the metallic layer and the overlayer are not important for the purpose of the present invention as long as the relative strengths of interlayer adhesion explained hereinafter are respected. It is furthermore obvious that the metallic layer, whether in the form of a thin film or in the form of a thin foil, may be bonded to the substrate by means of any appropriate bonding agent well known in the art, thus providing any suitable bonding strength between the metallic layer and the substrate which is either stronger or weaker than the force of adhesion between the metallic layer and the overlayer.

The electromagnetic-radiation-sensitive element 10 of FIG. 1 is subsequently exposed, as shown schematically in FIG. 2, to incident electromagnetic actinic radiation, as shown at 22, through a mask 24. The mask 24 is provided with areas, such as shown at 26, which are transmissive of the electromagnetic actinic radiation 22, while other areas, as shown at 28, are substantially nontransmissive of the electromagnetic actinic radiation. Alternately, the radiation-sensitive element 10 may be exposed by projecting thereon an actinic image presenting areas of high illumination and areas of reduced or no illumination according to the pattern which is sought to be reproduced. Whatever the method used for exposing or irradiating the radiation-sensitive element 10, areas as shown at 30 at the boundary 20 between the metallic layer 14 and the overlayer 16 are subjected to irradiation, while other areas, as shown at 32, remain uneffected.

The exposure of the radiation-sensitive element 10 takes place for a substantially short period of time and under an intensity of illumination sufficient only to provoke at the areas 30 subject to irradiation an interreaction between the metallic layer 14 and the material of the overlayer 16, providing at portions of the interface 20 corresponding to such areas the formation of an interreaction product or products 34. With structures consisting of a silver metallic layer with an arsenic-sulfur overlayer, exposure times of several seconds with an illumination from a 35– to 100-watt incandescent lamp light source is sufficient. The strength of adhesion at the interface 20 between the metallic layer 14 and the overlayer 16 at the areas corresponding to such irradiated areas 30 at which there is formed the interreaction product or products 34 is substantially reduced to a value which is much less than the strength of adhesion at the interface 18 between the metallic layer 14 and the substrate 12, such that when the overlayer 16 is peeled off, as hereinafter explained, portions of the metallic layer 14 which are strongly adhering to the overlayer 16, thus corresponding to the nonirradiated portions 32 of the boundary 20 therebetween, remain adhering to the overlayer 16, while other portions of the metallic layer 14 cleanly sheer off from the portions of the metallic layer 14 carried away during peeling of the overlayer 16 and remain strongly adhering to the substrate 12.

Any appropriate convenient means for peeling off the overlayer 16 may be used, although a preferred method comprises binding to the outer surface of the overlayer 16 a member 36, FIG. 3, provided with a coating of adhesive 38 forming with the overlayer 16 a strong bond, i.e., a bond having more strength than the strength of adhesion between the metallic layer 14 and the substrate 12. With the previously described example of structure consisting of a silver layer 14 vacuum deposited on a glass substrate 12 and provided with a vapor deposited overlayer 16 of arsenic-sulfur, an appropriate convenient peeling member 36 consists of commercially available pressure-sensitive adhesive tape. Consequently, when the overlayer 16 is peeled away in the direction of arrow 40 in FIG. 4, portions of the metallic layer 14, as shown at 42 in FIGS. 4 and 5, which are still strongly adhering to the overlayer and which correspond to the areas 32 which have not been irradiated, remain attached to the overlayer 16, while other portions 44 of the metallic layer 14, which correspond to the areas 30 of FIG. 2 which have been irradiated with the result that an interreaction product or products have been formed at the interface between the metallic layer and the overlayer, are easily detached from the overlayer 16 and remain adhering to the substrate 12, as shown at 44. There is thus formed a silicon or metallic pattern formed by the portions 44 of the metallic layer upon the substrate 12, as shown at 11 in FIG. 5. The silicon or metallic pattern is a silicon or metallic negative reproduction of the pattern on the mask 24 of FIG. 2 or, if alternately an image has been projected upon the radiation-sensitive element 10, it is a negative silicon or metallic reproduction of such image.

The article 11, consisting of such silicon or metallic relief pattern on a support member or substrate is the finished article obtained according to one aspect of the present invention, the article being such as a printed circuit, a printing plate, etc.

The article may be made such that the substrate 12 is substantially transmissive of electromagnetic actinic radiation, such as light, by being made, for example, of glass as is the case in the example hereinbefore explained in details or a transparent plastic, while the silicon or metallic pattern formed by the portions 44 thereon is substantially nontransmissive of such radiation. Consequently, the article 11 may be used as a mask, as shown at FIG. 6, for exposing a second electromagnetic-radiation-sensitive element 10 to incident actinic radiation 22 for an exposure sufficient to cause at the irradiated areas of the interface 20 between the overlayer 16 and the metallic layer 14 of the second electromagnetic-radiation-sensitive element, the formation of an interreaction product or products, as shown at 34 in FIG. 7. Thereafter, the overlayer 16 may be peeled off, as previously indicated, so as to remove from the substrate 12 portions of the metallic layer 14 strongly adhering to the overlayer, as shown at 42, and so as to leave on the substrate a pattern consisting of the portions 44 of the metallic layer still adhering thereto. The article 11′ thus obtained is a negative reproduction of the silicon or metallic pattern or image forming the article 11 of FIGS. 5 and 6, and is therefore a positive reproduction of the original mask 24.

Figure 9:
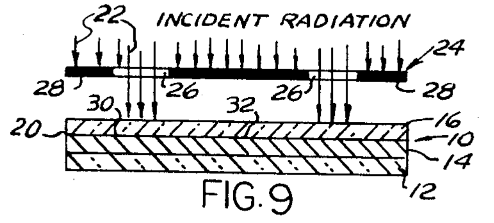
FIGS. 9–13 are schematic representations of consecutive steps according to another aspect of the method of the present invention.

Referring now generally to FIGS. 9–13 and more particularly to FIG. 9, according to another aspect of the present invention an electromagnetic radiation sensitive element 10, as previously described, is exposed, also as previously described, selectively and discretely to incident electromagnetic actinic radiation 22, such as intense white light, through a mask 24 provided with an appropriate pattern consisting of portions, such as shown at 26, which are substantially transmissive of the incident actinic radiation, while other portions 28 of the mask are substantially nontransmissive of the radiation. The radiation-sensitive element 10 is thus exposed such that portions of the incident radiation 22 impinge upon the overlayer 16 and cause an interreaction between the material of the overlayer 16 and the metallic layer 14, as defined herein, at the irradiated areas 30 of the interface or boundary 20 therebetween, while other areas, shown at 32, are shielded from the radiation. It is obvious that other means, as hereinbefore explained, may be used for selectively and discretely exposing the electromagnetic-radiation-sensitive element 10 to the incident electromagnetic actinic radiation, such as projecting upon the surface of the radiation-sensitive element, by any appropriate well-known projection means, an appropriate pattern image.

Figure 10:
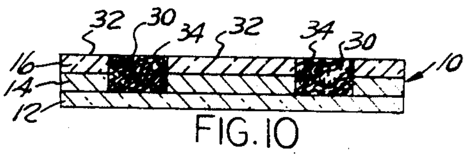

The radiation-sensitive element 10 is exposed to incident electromagnetic radiation for a duration of time sufficient to cause sufficient interreaction between the material of the overlayer 16 and the metallic layer 14 to consume in depth all of the metallic layer at discrete portions thereof corresponding to the areas 30 thus irradiated, with the formation of the interreaction product, as shown at 34 in FIG. 10. With structures consisting, for example, of a silver metallic layer 14 about 2,000 to 4,000 A. thick, exposure times of 3 to 4 minutes to a 100-watt incandescent lamp light source are sufficient for that purpose.

Figure 11:
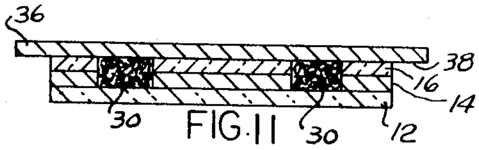
Figure 12:
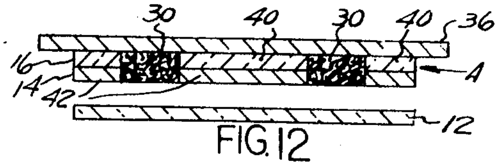

According to an aspect of the present invention, an appropriate flat member 36 made of any convenient material is disposed, as shown at FIG. 11, in contact with the outer surface of the overlayer 16, the member 36 being provided on its face in contact with the outer surface of the overlayer 16, with a coating 38 of an adhesive forming a substantially strong bond with the surface of the overlayer. All that is required is that the bond formed between the member 36 and the overlayer 16 be stronger than the bond formed between the metallic layer 14 and the substrate 12, such that the assembly formed by the member 36 having adhering thereto the remaining portions 40 of the overlayer 16 and the remaining portions 42 of the metallic layer 14 is easily separated from the substrate 12, as shown at FIG. 12, when the member 36 is pulled away. As previously indicated, with structure consisting of a metallic silver layer on a polished glass substrate, the metallic layer being provided with an arsenic-sulfur overlayer, commercially available pressure adhesive tape is a convenient material for the member 36.

The resulting article is article A of FIG. 12 consisting of the member 36 provided with a silicon or metallic pattern formed by the remaining portions 42 of the metallic layer 14, the remaining portions 40 of the overlayer 16 being disposed between such silicon or metallic portions 42 and the member 36. Such article A is a useful article for some applications. For example, the article A may be used as an intaglio printing plate, the surface portions formed by the interreaction product 30 being substantially oleophilic or susceptible of wetting by an inking agent or the like, while the surface of the silicon or metallic portions 42 is substantially impervious to wetting by the inking agent.

Figure 13:
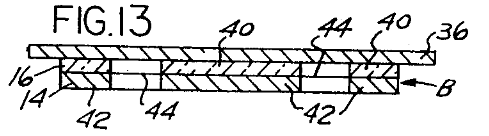

For other applications, it is preferable to remove the interreaction product 30, such removal being effected by means such as wiping with a dry cloth or brushing with a medium stiff bristles brush, or by chemical means such as by dissolution of the interreaction product in an aqueous solution of a base, whereby the resulting article is as article B of FIG. 13 provided with a relief silicon or metallic image consisting of the remaining portions 42 of the metallic layer 14 disposed in adhesion with the remaining portion 40 of the overlayer 16, recesses 44 being formed at the portions of both layers having interreacted during exposure to the pattern forming incident electromagnetic actinic radiation.

Figure 14:
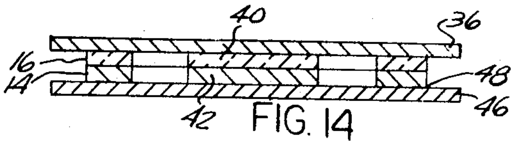
FIGS. 14–17 are schematic representations of subsequent alternate steps according to said other aspect of the method of the present invention.

According to a further aspect of the present invention, the metallic layer 14 of article B is placed in adhesion with a substrate 46 having on a face 48 thereof, in contact with the metallic layer, an adhesive forming an appropriate bond with the surface of the metallic layer 14, as shown in FIG. 14. The substrate 46 may be of any convenient material, such as a metallic foil, a plastic sheet, a paper board or the like and the adhesive may be any convenient conventional bonding agent, an epoxy resin or a pressure-sensitive adhesive. The substrate 36 previously disposed on the surface of overlayer 16 is in this case made of a material which is substantially transmissive of electromagnetic actinic radiation, such material being, for example, a glass, a transparent plastic, or the like.

Figure 15:
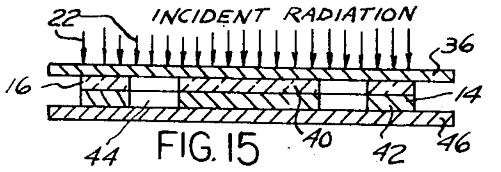
Figure 16:
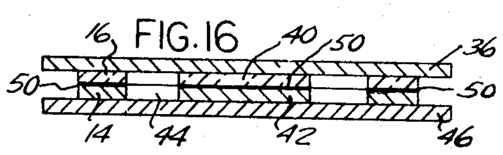
Figure 17:
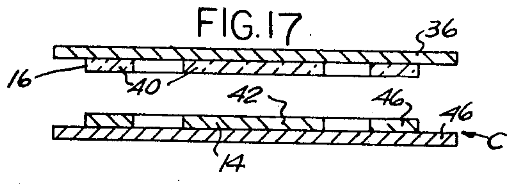

The assembly thus formed is subjected to a second exposure to incident electromagnetic actinic radiation 22, impinging upon the side thereof provided with the radiation transmissive substrate 36, as shown in FIG. 15, for a substantially short duration in time and with an intensity sufficient to cause a slight interreaction between the remaining portions 40 and 42 of, respectively, the overlayer 16 and the metallic layer 14, causing at the interface or boundary therebetween the formation of a slight amount, as shown at 50 in FIG. 16, of interreaction product causing a substantial decrease in the force of adhesion between the remaining portions 40 and 42 of the overlayer 16 and the metallic layer 14. As a result of such decrease of the force of adhesion therebetween, the overlayer 16 may be separated or stripped from the metallic layer 14, thereby obtaining the article C, FIG. 17, comprising a silicon or metallic pattern formed by the remaining portions 42 of the metallic layer 14 disposed upon the substrate 46.

It can thus be seen that by way of the methods of FIGS. 1–5, 6–8, and 9–17, alternate finished articles may be obtained consisting principally of a silicon or metallic pattern upon a substrate, by way of the method of FIGS. 9–13, although similar articles may be obtained, however, with the remaining portions of the overlayer 16 being disposed between the metallic pattern and the substrate, while by way of the method illustrated in FIGS. 9–17, a silicon or metallic pattern is formed upon an appropriate substrate, such metallic pattern being actually transferred from the original substrate on the electromagnetic-radiation-sensitive element to an appropriate different support or substrate. The radiation-sensitive element 10 of FIG. 1 or FIG. 9 may actually be considered as a universal purpose element for obtaining, by way of the methods of FIGS. 1–5 or 1–8 or the transfer method depicted at FIGS. 9–17, an appropriate metallic pattern on an appropriate substrate.

For special applications, where the material and other characteristics of the substrate upon which a metallic pattern is desired are known, the electromagnetic-radiation-sensitive element may be custom made so as to be provided, during manufacture, with an appropriate substrate material disposed in adhesion with the metallic layer. Such an electromagnetic-radiation-sensitive element is shown, schematically in section, at 10′ in FIG. 18. The radiation-sensitive element 10′ is formed of an appropriate substrate 46 having adhering thereto a metallic layer 14 as defined herein and made of silicon or one or several of the metals hereinbefore mentioned, such as silver, for example, vacuum deposited, for example, on the substrate. The metallic layer is in turn provided with an overlayer 16 of an inorganic material capable of interreacting with the metallic layer 14 when exposed to electromagnetic radiation. The overlayer 16 is made of any of the inorganic materials hereinbefore mentioned such as an arsenic-sulfur mixture, for example, and is, for example, vacuum deposited on the surface of the metallic layer 14. For ease of manipulation in the course of successive steps for obtaining an appropriate pattern on the substrate 46, as will be hereinafter explained in detail, the radiation-sensitive element 10′ is preferably provided with a radiation transmissive layer 36, made of a nonreactive material such as a transparent glass, plastic, or the like.

Figure 18:
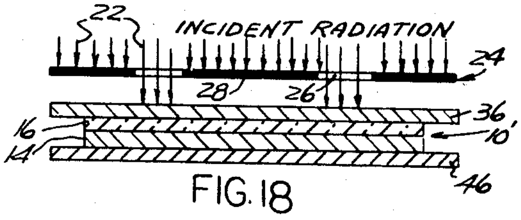
FIGS. 18–19 are schematic representations of consecutive steps according to a further aspect of the method of the present invention.
Figure 19:
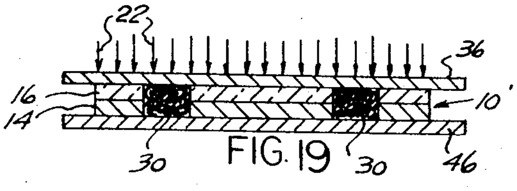
Figure 20:
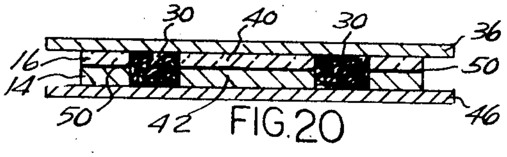
Figure 21:
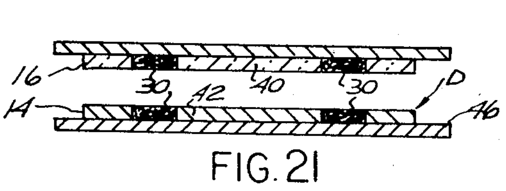
Figure 22:
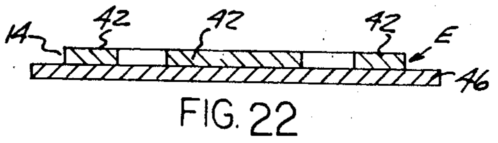

The radiation-sensitive element 10′ is selectively and discretely exposed to electromagnetic actinic radiation 22, as shown in FIG. 18, by exposure through a mask 24, or by projecting on the element an appropriate image. Exposure to electromagnetic actinic radiation is effected for a period of time and with an intensity sufficient to provoke at the irradiated areas of the element an interreaction between the metallic layer 14 and the inorganic material of the overlayer 16 causing an in-depth consumption of the metallic layer, with the formation of interreaction product 30 at such irradiated areas, as shown in FIG. 19. In order to reduce the force of adhesion between the metallic layer 14 and the overlayer 16, the radiation-sensitive element 10′ is subsequently uniformly exposed to incident actinic radiation for a brief period of time so as to cause the formation of a very thin layer of interreaction product 50 at the interface or boundary therebetween, as shown in FIG. 20, such that the overlayer 16 may easily be separated from the metallic layer 14, as shown in FIG. 21, leaving on the substrate 46 a pattern consisting of the remaining portions 42 of the metallic layer 14 and portions of the interreaction product 30 corresponding to the areas selectively and discretely irradiated, thus obtaining finished article D. After removal of the interreaction product 30, the resulting article is as shown at E in FIG. 22, consisting of an appropriate pattern formed by the remaining portions 42 of the metallic layer 14 disposed on the substrate 46.

In order to further simplify the method illustrated at FIGS. 18–20, the selective and discrete exposure to incident actinic radiation, illustrated in FIG. 18, may be effected through a mask or by means of an image projected upon the radiation-sensitive element 10′ in such manner that a small amount of actinic radiation is permitted to impinge uniformly upon the radiation-sensitive element, with selective and discrete portions being irradiated with a greater radiation intensity, such portions corresponding to the transmissive portions 26 of the mask 24, such that the second exposure illustrated at FIG. 19 is effected at the same time as the selective and discrete exposure to the pattern image, illustrated in FIG. 18.

It can thus be seen that the methods of the present invention provide for making silicon or metallic patterns on any appropriate substrate by means of a radiation-sensitive element, without requiring any complicated or delicate chemical processing of the element after exposure to an appropriate actinic radiation image of the pattern to be obtained.

Having thus described the invention by a few examples thereof, given for illustrative purpose only, what is sought to be protected by United States Letters Patent is as follows:

1. A method for obtaining a pattern on a substrate comprising:

coating said substrate with a layer selected from the group consisting of silver, copper, lead, cadmium, zinc, iron, tin, arsenic, bismuth, cobalt, germanium, indium, manganese, mercury, nickel, selenium, silicon, tellurium, thallium and vanadium, such that said layer adheres to said substrate with a relatively weak bond;

coating said layer with an overlayer of an inorganic material substantially transmissive of electromagnetic actinic radiation and capable of actinically reacting with said layer at the interface therebetween, said overlayer adhering to said layer with a bond which is relatively stronger than the bond between said layer and said substrate, the material of said overlayer being different from that of said layer and being selected from the group consisting of sulfur, selenium, M–X compounds and mixtures and M–X–Y compounds and mixtures wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium;

discretely and selectively exposing to electromagnetic actinic radiation said overlayer for actinically reacting adjoining areas of said layer and said overlayer for reducing the adhesion therebetween at said areas to a value less than the adhesion between said layer and said substrate; and peeling said overlayer so as to leave on said substrate portions of said layer corresponding to said areas.

2. The method of claim 1, wherein the step of peeling said overlayer is accomplished by means of a member provided with an adhesive forming with said overlayer a bond having an adhesion stronger than the adhesion between said substrate and said layer.

3. A method for obtaining a pattern on a substrate comprising:

discretely and selectively exposing to electromagnetic actinic radiation by projection of an actinic image of the pattern to be obtained on the surface of an electromagnetic-radiation-sensitive element comprising said substrate with an adhering layer thereon of a material selected from the group consisting of silver, copper, lead, cadmium, zinc, iron, tin, arsenic, bismuth, cobalt, germanium, indium, manganese, mercury, nickel, selenium, silicon, tellurium, thallium and vanadium, said layer being relatively weakly adhering to said substrate and being provided with a more strongly adhering overlayer of an inorganic material substantially transmissive of said electromagnetic actinic radiation and capable of interreacting when subjected to illumination with said layer for forming an interreaction product at the boundary therebetween causing a substantial reduction of adhesion between said layer and said overlayer, said inorganic material being different from the material of said layer and being selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, wherein exposing said element to said actinic image projected thereon is with an intensity and for a time sufficient to cause discretely and selectively such interreaction at portions of said boundary subjected to illumination so as to discretely and selectively reduce the adhesion of said overlayer and said layer at said portions; and separating said overlayer from said layer whereby said overlayer peels from said substrate portions of said layer which have not interreacted therewith such that there is formed on said substrate a pattern adhering thereto which is a negative reproduction of said actinic image.

4. The method of claim 3, wherein said overlayer is separated from said layer by means of a member provided with an adhesive coating forming with the outer surface of said overlayer a bond stronger than the adhesion between said substrate and said layer.

5. The method of claim 3, further comprising the steps of:

illuminating with electromagnetic actinic radiation a second electromagnetic-radiation-sensitive element like said first-mentioned electromagnetic-radiation-sensitive element by projecting thereon said pattern obtained on a substrate, and separating the overlayer from the layer of said second element so as to obtain on the substrate of said second element a pattern which is a positive reproduction of said original image.

6. A method for obtaining a pattern on a substrate comprising:

coating said substrate with a layer of a first material having a predetermined adhesion thereto, said layer being selected from the group consisting of silver, copper, lead, cadmium, zinc, iron, tin, arsenic, bismuth, cobalt, germanium, indium, manganese, mercury, nickel, selenium, silicon, tellurium, thallium and vanadium;

coating said layer with an overlayer of a second material different from said first material and capable of actinically reacting with said first material, the adhesion between said overlayer and said layer at the boundary therebetween being greater than said predetermined adhesion between said substrate and said layer, said second material being substantially transmissive of said electromagnetic actinic radiation and being selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver and X and Y are selected from the group consisting of halogen, sulfur, selenium and tellurium;

projecting an image of the pattern to be obtained for a time and with an actinic radiation intensity sufficient to discretely and selectively cause an interreaction at the boundary between said overlayer and said layer reducing the adhesion therebetween below said predetermined adhesion between said substrate and said layer; and peeling said overlayer such that portions of said layer remain attached to said overlayer which correspond to portions of said boundary which have not been interreacted and complementary portions of said layer which have been interreacted remain attached to said substrate, where by a pattern is formed on the substrate which is a negative reproduction of said image.

7. The method of claim 6, wherein said overlayer is peeled by means of a member provided with an adhesive coating forming with the outer surface of said overlayer a bond stronger than the adhesion between said substrate and said layer.

8. A method for making a metallic pattern by means of an electromagnetic-radiation-sensitive element comprising two dissimilar layers substantially adhering to each other, the first of said layers adhering to a substrate and the second of said layers being an overlayer of an inorganic material different from that of the first of said layers and capable when exposed to electromagnetic actinic radiation to form an interreaction product with the material of said first layer, said first layer being disposed on said substrate with a force of adhesion which is weaker than the force of adhesion with which said second layer is disposed on said first layer, said second layer being substantially transmissive of said electromagnetic actinic radiation, wherein the material of said first layer is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, and the material of said second layer is selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, said method comprising the steps of:

impinging an actinic radiation defined image upon said second layer for causing selectively and discretely the formation of said interreaction product at predetermined areas of the boundary between said second layer and said first layer for selectively and discretely consuming in depth portions of said first layer all the way through to said substrate;

attaching a second substrate to said second layer; and removing said first substrate.

9. The method of claim 8, further comprising the step of removing said interreaction product.

10. The method of claim 8, wherein said second substrate is substantially transmissive of said electromagnetic actinic radiation and further comprising the steps of:

attaching said first layer to a support member;

subsequently exposing said radiation-sensitive element uniformly to electromagnetic actinic radiation for causing an interreaction at the remaining areas of the boundary between said second and first layers sufficient only for reducing the adhesion therebetween; and removing said second layer by peeling said second layer from said first layer.

11. A method for obtaining a pattern on a substrate comprising:

discretely and selectively exposing by projection of an actinic image of the pattern to be obtained the surface of an electromagnetic-radiation-sensitive element comprising said substrate with an adhering first layer of a first material thereon, said layer being provided with a strongly adhering second layer, of a second material different from said first material and capable of interreacting when exposed to said actinic radiation with said first material for forming an interreaction product therewith, wherein said first material is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, said second material is substantially transmissive of said electromagnetic actinic radiation and is selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium;

exposing said electromagnetic-radiation-sensitive element to an actinic image projected thereon for a time sufficient to cause discretely and selectively said interreaction so as to discretely and selectively consume in depth portions of said first layer all the way through to said substrate;

exposing said electromagnetic-radiation-sensitive element uniformly to electromagnetic actinic radiation for causing an interreaction at the remaining areas of the boundary between said first and second layers sufficient only for reducing the adhesion therebetween;

separating second layer from said first layer; and removing said interreaction product such that there is formed on said substrate a pattern adhering thereto which is a reproduction of said image.

12. The method of claim 4, wherein said second layer is separated from said first layer by means of a member provided with an adhesive coating forming with the outer surface of said second layer a bond stronger than the reduced adhesion between said second and first layers.

13. A method for making a relief pattern by means of an electromagnetic-radiation-sensitive element comprising a substrate provided with a first layer of a material coated with an adhering second layer of an inorganic second material substantially transmissive of electromagnetic radiation and capable of interreacting when exposed to electromagnetic actinic radiation with said first material with the formation of an interreaction product, said first material being selected from the group consisting of silver, copper, lead, cadmium, zinc, iron, tin, arsenic, bismuth, cobalt, germanium, indium, manganese, mercury, nickel, selenium, silicon, tellurium, thallium and vanadium, said inorganic second material being different from said first material and being selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, said method comprising the steps of:

projecting an actinic radiation image of the pattern to be reproduced on the electromagnetic-radiation-sensitive element so as to consume in depth discrete portions of said first layer;

exposing said radiation-sensitive element uniformly to said electromagnetic actinic radiation sufficiently to reduce the force of adhesion between the second and first layers; and removing the remaining of said second layer so as to leave a pattern of the portions of the nonreacted first layer on said substrate.

14. The method of claim 13, wherein the step of removing the remaining of said second layer is effected by means of a member provided with an adhesive coating forming with said second layer a bond stronger than the reduced adhesion between said second and first layers.

15. The method of claim 13, further comprising removing said interreaction product.

16. The method of claim 14, further comprising removing said interreaction product.

* * * * *

TRI-115-B-3

UNITED STATES PATENT OFFICE

CERTIFICATE OF CORRECTION

Patent No. 3,637,377 Dated January 25, 1972

Inventor(s) ROBERT W. HALLMAN ET AL

It is certified that error appears in the above-identified patent and that said Letters Patent are hereby corrected as shown below:

IN THE SPECIFICATION

Column 2, line 53, correct the spelling of "metallic"

Column 4, line 32, after "a" (1st instance) cancel "metallic"

before "layer" (second instance) insert - - metallic - -

Signed and sealed this 29th day of August 1972.

(SEAL)
Attest:

EDWARD M.FLETCHER,JR.
Attesting Officer

ROBERT GOTTSCHALK
Commissioner of Patents